(12) United States Patent  
Sedgewick et al.

(10) Patent No.: US 6,651,920 B2
(45) Date of Patent: Nov. 25, 2003

(54) METHOD AND APPARATUS FOR WINDING AND FORMING MOTOR COIL ASSEMBLIES

(75) Inventors: James Sedgewick, York, ME (US); Richard Sedgewick, Dover, NH (US); David Carroll, Strafford, NH (US); Michael Drew, Milton, NH (US)

(73) Assignee: Airex Corporation, Dover, NH (US)

( * ) Notice: Subject to any disclaimer, the term of this patent is extended or adjusted under 35 U.S.C. 154(b) by 303 days.

(21) Appl. No.: 09/737,010

(22) Filed: Dec. 14, 2000

(65) Prior Publication Data

US 2002/0074052 A1 Jun. 20, 2002

Related U.S. Application Data

(60) Provisional application No. 60/170,809, filed on Dec. 15, 1999.

(51) Int. Cl.[7] ............................ B21F 3/04; B65H 81/06; H01C 17/04
(52) U.S. Cl. ....................................................... 242/437
(58) Field of Search ................................. 242/437, 443, 242/445.1, 433.2

(56) References Cited

U.S. PATENT DOCUMENTS

| 1,557,407 A | * | 10/1925 | Bittner ........................ 242/437 |
| 4,103,718 A | * | 8/1978 | Steigerwald ................. 140/105 |
| 4,581,820 A | * | 4/1986 | Zahn et al. ..................... 29/855 |
| 4,839,543 A | | 6/1989 | Beakley et al. ................ 310/12 |
| 5,198,066 A | * | 3/1993 | Cederstrom .................. 156/538 |
| 5,597,433 A | * | 1/1997 | Dyble et al. ................. 156/203 |
| 6,401,333 B1 | * | 6/2002 | Suzuki et al. .................. 29/848 |
| 6,425,544 B1 | * | 7/2002 | Takeda ......................... 242/443 |

* cited by examiner

*Primary Examiner*—Emmanuel Marcelo
(74) *Attorney, Agent, or Firm*—Grossman Tucker Perreault & Pfleger, PLLC (57) ABSTRACT

A coil winding system and process is provided that includes a coil winding fixture and a coil press fixture. The coil winding fixture includes a pair of winding arms each having a set of in-line winding pins. The sets of in-line pins are arranged parallel to one another in one axis, and form an angle to another axis. Magnetic wire is machine wound into the slots between the pins to form coil phases, and, advantageously the individual coils can be wound together to minimize spatial tolerance build-up between phases. Likewise the slots are arranged parallel and adjacent one another to ensure that each winding is parallel to the next to maximize efficiency of the coils. The press fixture includes a forming press and a saddle to form the wound coils into a predetermined shape using heat and pressure applied to the press fixture.

24 Claims, 6 Drawing Sheets

METHOD AND APPARATUS FOR WINDING AND FORMING MOTOR COIL ASSEMBLIES

This application claims priority to application Ser. No. 60/170,809, filed Dec. 15, 1999, which is hereby incorporated by reference.

BACKGROUND OF THE INVENTION

1. Field of the Invention

The present invention relates generally to apparatus and methods for winding and forming motors, and, more particularly, to apparatus and methods for winding and forming linear motors to increase the parallel arrangement between windings and to produce higher accuracies between phases of the motor. Particular utility for the present invention is in winding one or more phases of a linear motor, although the present invention can also be used for winding rotary motor coils, and for ironless, toothless linear motors and iron core, toothless linear motors.

2. Background Discussion

The current practice in linear and often rotary motor manufacturing is to wind each coil (phase) separately and to then form each single wound coil independently, such that each coil phase will occupy a space proportionate to a single pole in a multi-pole motor assembly. This is illustrated in FIG. 1 of U.S. Pat. No. 4,839,543. This figure depicts nine individually formed coils that make up the poles of a three-phase motor. The coils are wound by hand or on a "bobbin winder" and are then assembled by interleaving into finished form.

The forming process is generally associated with each single wound coil phase, and is typically done in a flat fixture. The winding must be confined in all directions to result in final, finished dimensions. The coils are toleranced to minimize the impact on the final assembly, however, some sub-optimal result is anticipated due to needed clearance gaps between the coils caused by erratic tolerance accumulations between the coils and in the finished assembly. This process results in a coil assembly with low conductor density and high phase position error as compared to the present invention.

If each single wound coil phase is not formed separately but as an entire assembly, the unconstrained conductors of each coil intermingle and can thereby be offset from their proper phase position. This reduces the motor performance, since conductors in a given coil not constrained to the given design space work against the forces generated by the properly positioned conductors. The cost and time associated with assembling and handling the multiple individual coils throughout the manufacturing process is also a disadvantage.

SUMMARY OF THE INVENTION

Accordingly, the present invention provides apparatus and methods of winding and forming a linear motor where multi-phase coils are wound and formed as single assembly. In the preferred embodiment, winding is achieved on a winding machine. This machine is essentially a multi-axis robot providing movement of a needle relative to a winding fixture. The winding machine for the linear motor provides a mechanical base for a plurality of winding configurations. This winding machine provides several axis of motion, safety monitors, quality assurance devices and programmable winding features for linear and rotary motor coils. The winding machine feeds and manipulates the magnet wire through a small diameter wire guide (needle) made of steel, ceramic or equivalent material. Accurate tensioners are provided to ensure proper wire tension during the winding process. The wire is laid over pins such that the coil forms a shape similar to the final motor configuration. This needle is attached to the central "X" and "Y" axis to provide motion across and above the winding fixture. The winding fixture is attached to a rotational axis providing rotary capability to the winding process. Minimal component specific tooling is required to complete the mechanical changeover between rotary and linear designs, or multiple configurations of the same design.

The linear motor coil is wound with a 'bondable' magnet wire. This wire has a special bonding material applied over the insulation coating that acts as an impregnant, partially surrounding each individual conductor when heated to the proper temperature. The bonding agent is a thermosetting epoxy that results in a structure that will not melt or sag when subjected to heat from subsequent operations or from a finished coil assembly under load.

Winding multiple phases on precisely placed pins provides the relative positioning of the coils by laying each group of copper conductors in precise position relative to one another. Additionally, assembly time is thereby reduced.

In one embodiment, the present invention provides a coil winding fixture, comprising: a first interchangeable winding arm having a first set of a plurality pins extending therefrom, said first plurality pins defining a first plurality of slots between two adjacent pins; a second interchangeable winding arm having a second set of a plurality pins extending therefrom, said second plurality pins defining a second plurality of slots between two adjacent pins; said first and second winding arms held in fixed relationship to one another so that said first and second plurality of pins are held at angles to one another, and so that said first plurality of slots and said second plurality of slots are held in parallel with respect to adjacent slots, so that magnetic wire can be wound around said pins and placed in the first and second plurality of slots.

In a system level embodiment, a coil winding system is provided that comprises: a winding machine for controlling a winding fixture in a rotational axis and a winding needle in a linear axis; said winding fixture comprising a first interchangeable winding arm having a first plurality of in-line pins extending therefrom, said first plurality pins defining a first plurality of slots between two adjacent pins; a second interchangeable winding arm having a second plurality of in-line pins extending therefrom, said second plurality pins defining a second plurality of slots between two adjacent pins; said first and second winding arms held in fixed relationship to form a winding fixture; said winding needle mounted on a needle arm, said needle arm mounted in a predetermined location with respect to said first and second in-line pins; said winding machine controlling the linear motion of said needle arm and said winding needle along said linear axis and the rotational motion of said winding fixture in said rotational axis to cause said winding needle to place magnet wire in a selected one of said slots.

A coil forming fixture is also provided that comprises: a bottom forming block having a slot dimensioned to receive a coil winding structure and a removable saddle placed in said slot for holding the coil winding structure on the face of the saddle; a top forming block placed over said coil winding structure, said-saddle and said bottom forming block; and a press placed over said top forming block and removably attached to said bottom forming block.

In method form, the present invention provides a process for coil winding that comprises the steps of: positioning magnetic coil wire adjacent to a first predetermined slot in a winding fixture; rotating said coil winding fixture to place said wire into said predetermined slot; positioning said wire adjacent to a predetermined second slot in said winding fixture, said second slot being a predetermined distance from said first slot; and rotating said coil winding fixture to place said wire into said predetermined other slot.

This winding techniques and apparatus provided by the present invention can be applied in both ironless, toothless linear motors and iron core, toothless linear motors where multiple phases are wound and phase position significantly impacts motor performance. The winding strategy provided herein to wind all phases together whenever possible eliminates handling, and provides an accurate method for wire placement and reduction of end turns, all of which directly impact motor efficiency. Particularly in ironless winding configurations (ironless motor designs), the form shape and size of the winding is paramount to the performance of the wound assembly.

It will be appreciated by those skilled in the art that although the following Detailed Description will proceed with reference being made to preferred embodiments, the present invention is not intended to be limited to these preferred embodiments. Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

Figure 1:
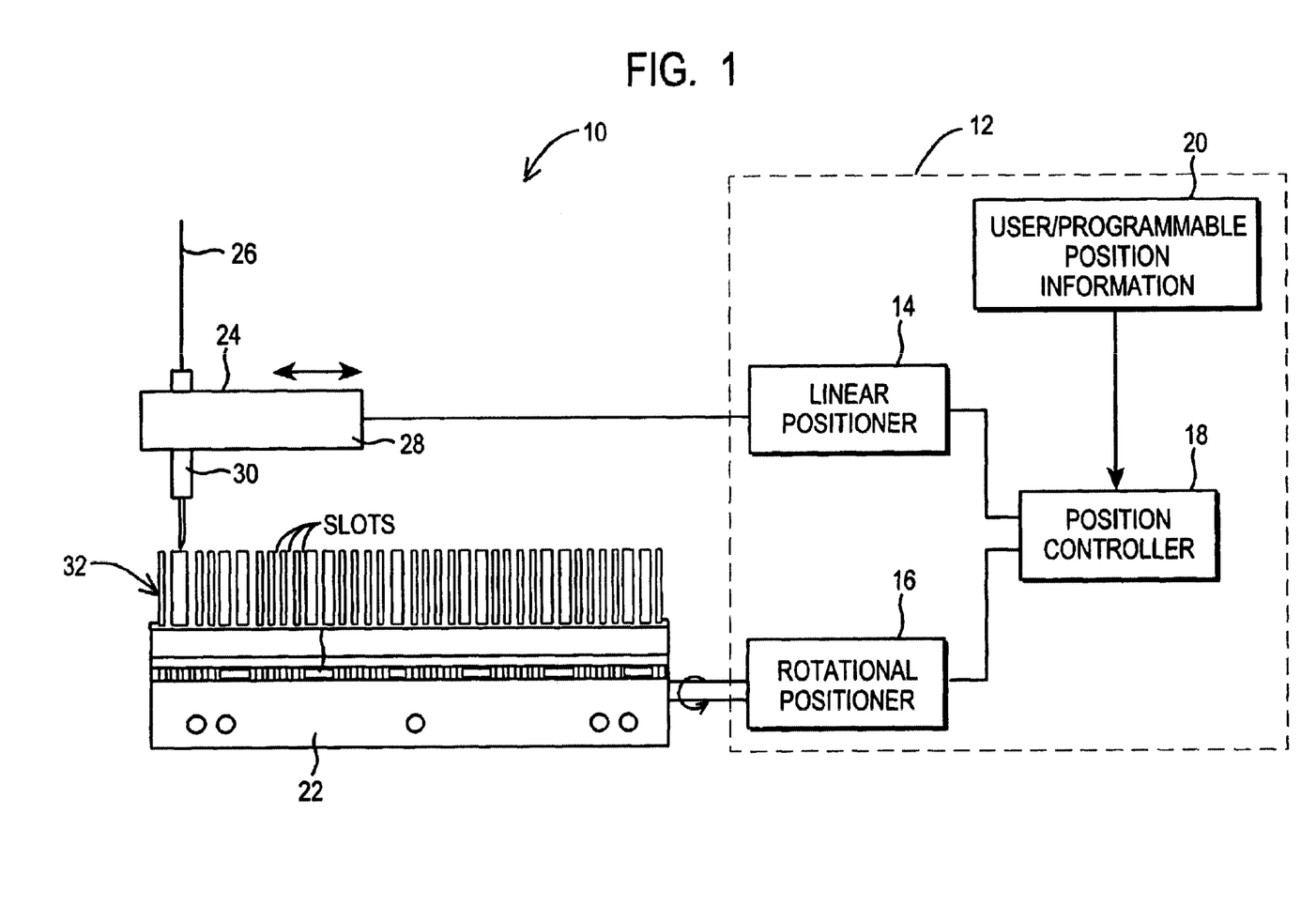
FIG. 1 is block diagram view of the exemplary coil winding system of the present invention.

FIG. 1 depicts a block diagram view of an exemplary coil winding system 10 of the present invention. The system 10 includes a winding machine 12 that includes a linear position mechanism (e.g. step controllable linear motor, etc.), a rotational position mechanism 16, a position controller 18 for sending linear and rotational position commands and data to the mechanism 14 and 16 respectively, and a programmable position input interface 20 to permit users to program/automate the winding process as described herein. Rotationally affixed to the rotational positioner is the winding fixture 22 according to the present invention. Affixed to the linear positioner 14 is the needle arm 28 according to the present invention. The needle arm 28 feeds magnet wire 26 to the winding fixture 22 according to the position commands generated by the position mechanisms 14 and 16, as described more fully below. The winding fixture 22 includes a plurality of pins 32 spaced apart to form slots, as shown. Needle arm 28, and more particularly winding needle 30, feeds the magnet wire in between selected pins, i.e., into the defined slots. The needle arm includes a winding needle 30 that feeds and guides wire 26 therethrough and into the slots. The needle arm may further include an actuator (not shown) to move the winding needle 30 up and down with respect to the needle arm, i.e. cause the needle to move closer to or further from the pins 32 of the winding fixture 22. The multi-axis winding machine 12 preferably includes the appropriate controllable motor mechanism to generate the relative movement herein described. Such a machine, for example, is manufactured by Airex Corporation The operation of the winding fixture and needle arm are described in greater detail below.

Figure 2A:
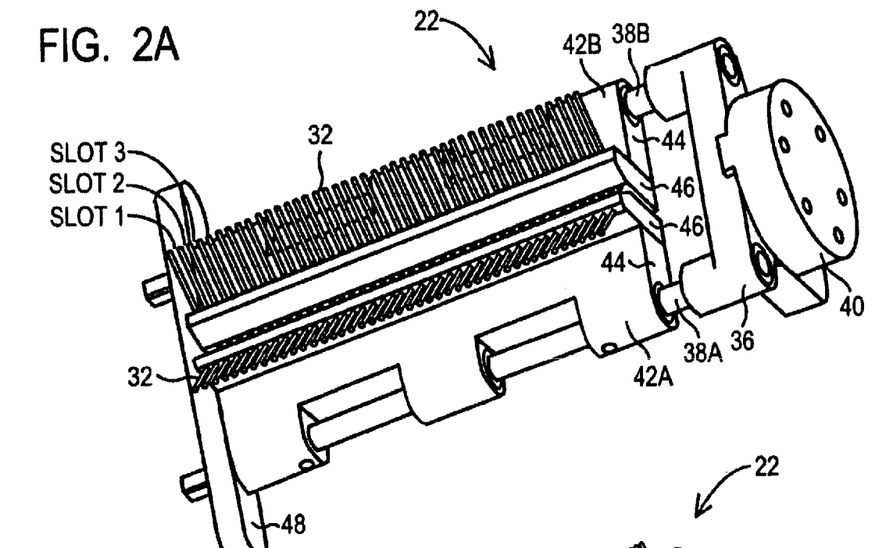
FIGS. 2A, 2B and 2C are different views of the exemplary winding fixture of the present invention.
Figure 2B:
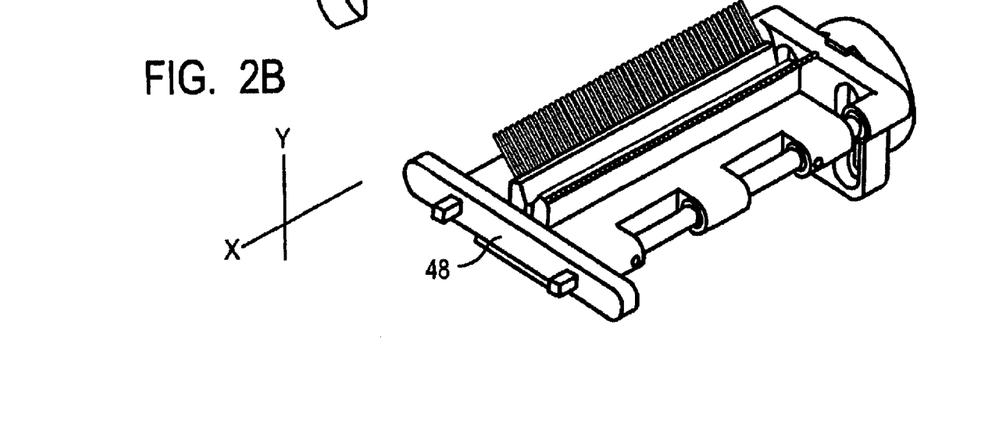
Figure 2C:
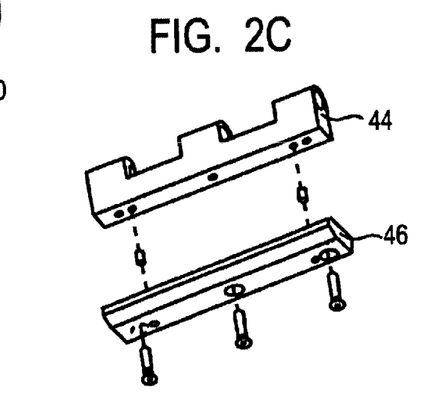

FIGS. 2A, 2B and 2C depict various isometric views of the winding fixture 22 of the present invention. In this example, the winding fixture includes a hub portion 36 having a pair of boss pins 38A and 38B extending from one side thereof and a mount plate 40 affixed to the other side thereof. Mount plate 40 connects the winding fixture 22 to the rotational mechanism 16 to permit rotation of the winding fixture. Mounted over each boss pin is a winding arm 42A and 42B, having the aforementioned winding pins 32 attached thereto. Winding arm 42A and 42B each comprise a first part 44 that attaches to the boss pins, and a second part 46 that holds the winding pins 32. First part 44 has slots or openings formed in one side to accept boss pins 38A and 38B, as shown. Second part 46 has openings to accept a predetermined number of pins 32. The pins 32 and the openings in the second part to hold the pins are dimensioned for a desired wire width, and may be interchangeable for different applications. Thus, to that end, the opening in the second part permitting interchangeability of pin sets by providing temporary holding mechanism such as set screws, etc. Alternatively, the in-line pin sets can be interchanged as a unit and attached to the second part.

At the opposite end of the winding fixture is a locking plate 48 having two mated openings therein to accept the ends of the boss pins, as shown in FIG. 2B. Preferably, boss pins have a geometric cross-sectional shape so that the locking plate, when positioned onto the boss pins, prevents any rotational movement of the winding arms. Thus, for example as shown, the boss pins can be formed square, and the opening in the locking plate are mated to the square boss pins. Of course, other locking mechanisms and means will be apparent to those skilled in the art, and all such alternatives are deemed equivalent. Winding arms 42A and 42B rigidly attached to boss pins 38A and 38B, respectively, but in the absence of the locking plate, the boss pins and winding are permitted to rotate, to open and close the winding fixture assembly as will be described below.

The winding pins 32 are arranged on each winding arm at an angle with respect the axis normal to the centerline axis (x-axis) of the fixture, i.e., the y-axis. For example, the angle can be chosen as 45 degrees off the centerline for each set of pins 32, in opposing directions, so that 90 degrees exists between the pin sets. To permit interchangeability, the winding arms and/or pin set can be removed from the boss pins are winding arms and replaced for a particular application. For example, the winding arm preferably includes opening to removably insert and temporarily hold a desired pin set for a given application, while permitting interchangeability of the pins to replace the pins having differing length and/or cross-sectional diameter. Alternatively, the entire winding fixture can be replaced for a desired application. The angle of each pin set can range from 0 to 90 degrees from the y-axis, and is shown in the exemplary diagrams at 45 degrees. An angle ensures that tension is placed on the wire that is fed into the slots. Also, the angle causes the wire to bend slightly on the outside of each pin, so that the end turns of each coil are properly formed, and minimized.

Figure 3:
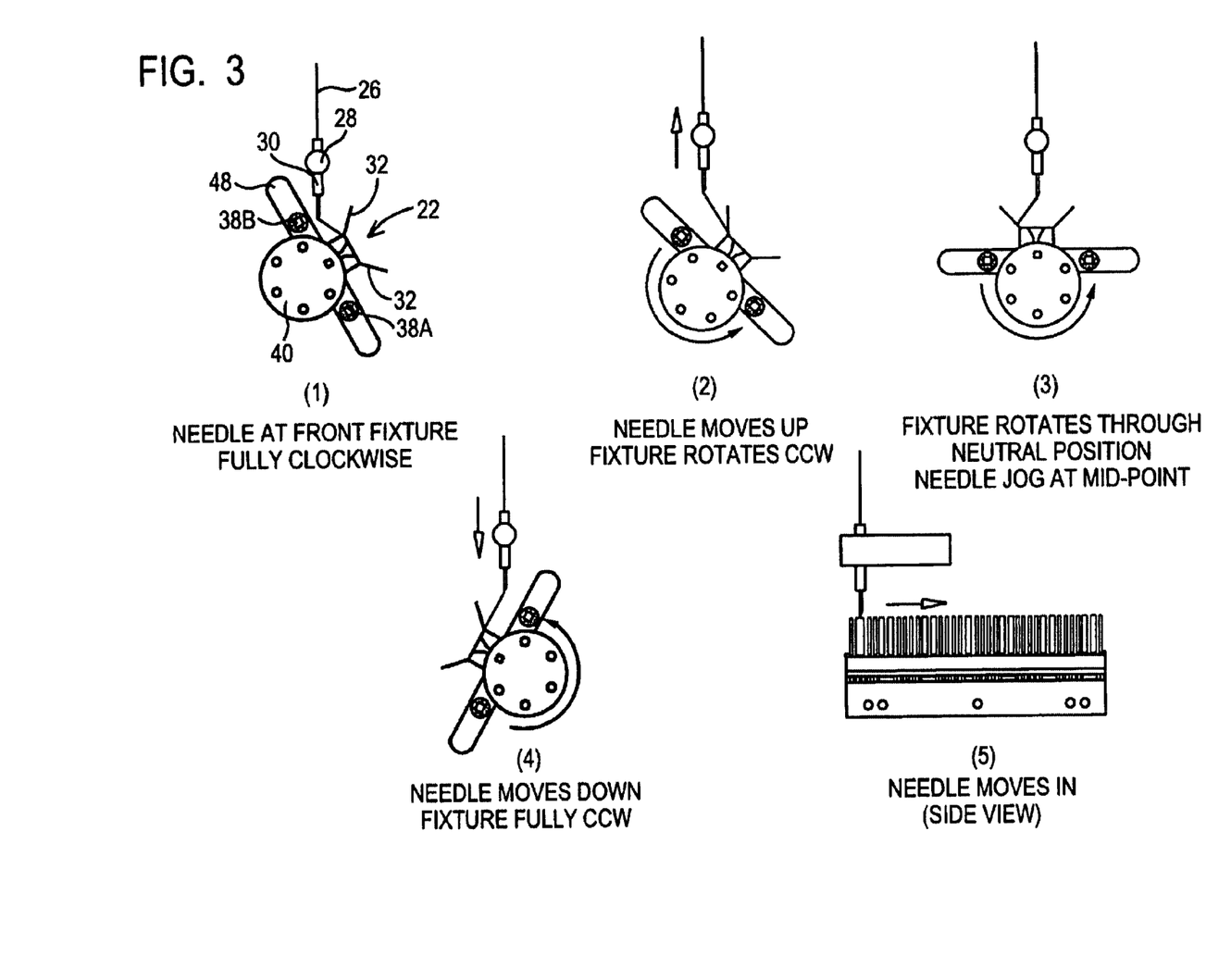
FIG. 3 is a compilation of views depicting the winding process using the winding system of the present invention.

FIG. 3 is a compilation of views depicting the winding process using the winding system 10 of the present invention. Exemplary steps (1)–(4), (6)–(8), (10) and (11) depict end-on views of the winding fixture 22, needle arm 28 and winding needle 30 shown in FIGS. 2A and 2B, and exemplary steps (5) and (9) depict side views of the winding fixture 22, needle arm 28 and winding needle 30 shown in FIGS. 2A and 2B. In these exemplary figures, assume that the winding fixture is mounted onto the boss pins in the position shown in FIGS. 2A and 2B, and that the winding fixture and needle arm are mounted onto the winding machine 12 as depicted in FIG. 1. In position (1), the needle 30 is positioned behind a row of pins 32, and the winding fixture is rotated fully clockwise to initiate the coil winding process. Wire 26 is fed through the needle and positioned into a predetermined slot, e.g., slot 1. A wire tensioner is preferably employed to ensure correct tension on the magnet wire. For example, the magnet wire spool may be fed through a pinch roller mechanism to control the tension on the wire. Since an appropriate amount of excess wire must be present for leads on each coil phase, the initial placement of wire onto the fixture may comprise taping additional wire above or below the pins, or rotating the fixture so that wire can be temporarily affixed to the fixture. Of course, notches or cutouts (not shown) can be provided at desired locations along the body of the fixture to hold additional lead wire for each coil phase. In position (2), the needle moves upward to clear the pins, and the fixture rotates to place wire fed through the needle and placed into the slot (slot 1), as shown in position (3). In position (4), wire is placed fully into the first slot and the needle moves downward to a position behind the pins as indicated by the arrow, thereby forming one side of the coil phase (i.e., a half pole of an individual coil phase). Moving the needle downward after each pass through the pin sets ensures that the end turn areas, i.e. those areas formed around the pins, are tight to the bottom of the pin, thereby minimizing end turn areas. In other words, moving the wire to the position shown in (4) bends the wire behind the pin without requiring excessive wire to form the end turn. Also, the angle between creates a tendancy for the wire to deposit at the junction of the bottom of the pin and the winding arm, causing the end turns to build up along the outside of the pin, i.e., under previously-positioned end turns. Once wire is placed in a slot, the winding machine moves the needle arm a predetermined distance to begin the other half pole in a predetermined slot, as shown in step (5). By way of example, assume that each half pole is two slots wide, each slot receives 10 wire feeds, and the machine is winding three coil poles. Thus, the first coil phase is wound in slots 1 and 2 for the first half pole, and slots 7 and 8 for the second half pole. Thus, in position (5) the winding machine instructs the needle arm to move between slots 2 and 7 for the first 10 wire feeds, and slots 1 and 8 for the second 10 wire feeds (assuming the pole is wound inside to outside).

Positions (6)–(9) repeat the process of positions (2)–(5), except the winding fixture rotates in the opposite direction to place wire into the other half pole slot. Steps (2)–(9) repeat to position 10 wires into each of the slots 2 and 7, then the process shifts to slots 1 and 8 and repeats to fill 10 wires into each slot to complete the coil. Once an individual coil is formed, step 1 repeats to ensure sufficient lead wire is provided between the first and second coil poles, and process steps (2)–(9) repeat until slots 4 and 9, and 3 and 10 (i.e., each half pole of the second coil) are properly deposited. Likewise, the process repeats for slots 6 and 11, and 5 and 12 for the third coil. Advantageously, using the winding pins described in the present invention ensures that each coil phase and each winding is parallel (or nearly parallel) with each other winding. Also, the coil phases can be wound directly adjacent to one another, and therefore, there is no need to allow tolerances for the interphase distance between the coils. Additionally, end turn areas, which do not contribute to coil performance (and, in fact, hinder heat transfer and efficiency characteristics) are minimized, since the coil is wound directly around the pins.

One advantageous aspect of the winding fixture of the present invention is that the fixture components are preferably interchangeable to accommodate varying wire gauge thickness, and to create coils of varying dimensions. For example, the winding pins depicted in the figures can be replaced with winding pins of a different cross-sectional diameter, thereby adjusting the dimension of the slot defined between two adjacent pins. Also, the length of the individual pins can be likewise changed. Additionally, the dimensions of the first and second winding arm members can be changed to form coils of desired dimensions for a particular application. Another aspect of the present invention is that the winding machine can be programmed to produce a desired winding pattern for the coils. Also advantageously, by winding the three phases of the motor together, there is little or no tolerance build-up between phases. Moreover, the pole positions are as accurate as the pin placement, since the pins create a fixed spacial relationship between each winding and each phase, thereby maximizing the amount of copper wire that can be placed within the slot. Likewise, with the selection of the appropriate pin diameter and pin spacing for a particular application and/or wire gauge, the density of the coil core is maximized.

Figure 4:
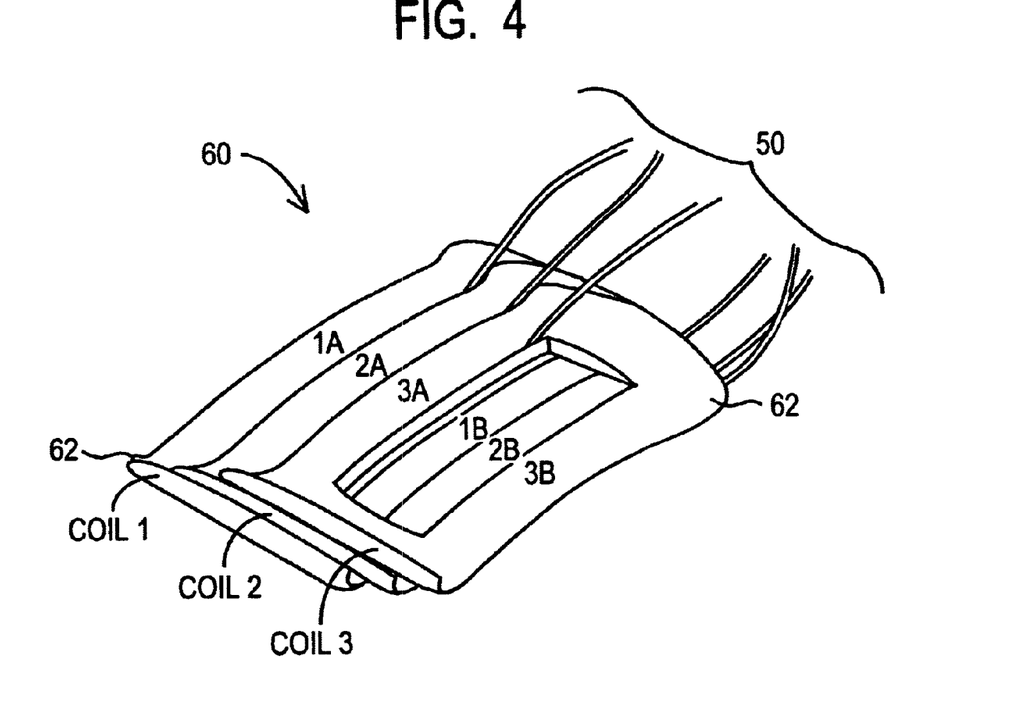
FIG. 4 is an isometric view of wound coils before the coils are pressed.

When the coils are fully wound, the coils are removed from the winding fixture in the following manner. As shown in step (10), the winding needle and needle arm are moved away from the winding fixture so as to provide unobstructed access to the wound coils. Preferably, the winding fixture is rotated so that the coils are nearly horizontal, as shown. Tape is applied (either manually or automatically) across and/or under the coils to prevent the coils from moving relative to each other once removed. The tape can be applied across the middle, or more preferably, at two locations near the end turns of the coils. In step (1), the locking plate is removed from the boss pins, so that the winding arms are free to rotate on or with the boss pins. The winding arms are rotated downward (i.e., each are rotated in opposite directions), to a point that the coils can be removed from the pins. The wound and removed coils are shown isometrically in FIG. 4 (without tape). FIG. 4 depicts three coil phases, labeled COIL 1, COIL 2, and COIL 3, each comprising half poles 1A, 1B, 2A, 2B, and 3A, 3B, respectively. Note that, once removed the wire lead extensions 50 between each coil phase provide the requisite electrical connection for each phase (i.e., two wires for each coil phase). The winding process described herein generates coils wound to programmable specifications via the winding machine. In other words, the winding machine controls the winding fixture and the winding needle to wind wire into the slots to form at least one motor coil having a predetermined half pole width defined by the number of slots wound per half pole, a depth defined by the number of times wire is wound into a slot, and a coil height defined by the space between said first and second in-line pins. The specifics of coil geometry are readily understood by those skilled in the art, and may be found, for example in U.S. Pat. No. 5,998,890 titled "Linear Motor With Improved Coil Design and Heat Removal", assigned to the same assignee, and hereby incorporated by reference in its entirety.

Figure 5:
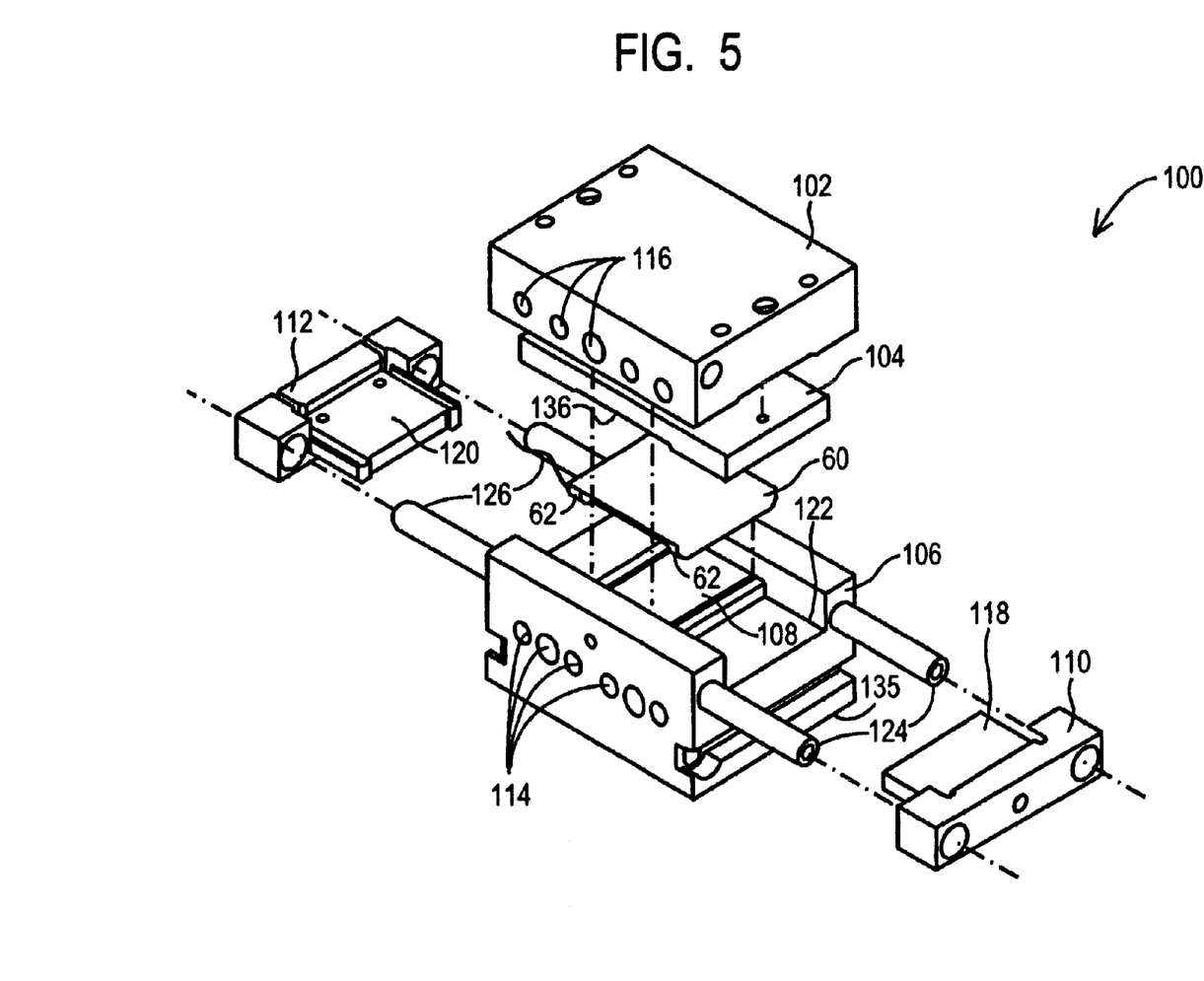
FIG. 5 depicts an exploded isometric view of an exemplary coil press fixture of the present invention.

Once wound, the coil is pressed to form a finished multiphase motor coil arrangement. Referring now to FIG. 5, an exploded isometric view of an exemplary coil press fixture 100 of the present invention is depicted. Essentially, the press fixture 100 is used with a conventional die set and/or other pressing means to press the coils depicted in FIG. 4 into a finished multiphase motor coil, depicted in FIG. 6. The magnet wire chosen for coil winding applications typically includes an additional epoxy resin bonding agent on each strand that is intended for heat curing process, such as manufactured by Phelps-Dodge. The press fixture 100 comprises a top mount plate 102, a top forming block 104 removeably mounted to the top mount plate 102, a bottom forming block 106 that include an interchangeable saddle 108, and two end forming block assemblies 110 and 112, and are horizontally pressed into the press fixture by pneumatic and/or hydraulic means. The wound or prepressed coil 60 depicted in FIG. 4 is placed between the top forming block 104 and the saddle/bottom forming block, as shown in FIG. 5, with the end-turn areas generated by the winding fixture placed over the lip of the saddle onto the bottom forming block.

Once the coil is inserted into the press, the top mount plate 102 is collapsed onto the bottom forming block to fix the coil in place. The press and the bottom forming block may be temporarily affixed by screws, clamps, etc. A plurality of electric cartridge heaters (not shown) are inserted into the heating ducts 116 and 114 formed in the top mount plate 102 and bottom forming block 106 respectively to provide heat transfer through the device. The pair of end forming blocks 110 and 112 are then removeably affixed to the bottom forming block to press the end turn areas of the coil.

The top forming block 104 preferably includes a groove portion 136 mated to the saddle 108 of the bottom forming blocks. The saddle and the top forming block are preferably removable from the top and bottom forming block, respectively, to permit interchangeability of parts 104 and 108 for desired coil press dimensions. 104 and 106 are likewise interchangeable to permit forming of different coil configurations. End forming blocks 110 and 112 each comprise a tongue member 118 and 120 dimensioned to fit into the slot 122 formed in the bottom forming block. The slot 122 also holds the saddle 108. The tongues 118 and 120 have a length to compress the end turn areas 62 of the coil 60 against the sides of the saddle 108. The tongues are further dimensioned to fit between the press 102 and/or top forming block 104 and the bottom forming block 106 with sufficient clearance to not interfere with the compression of the coils. The end forming blocks are removeably attached (using screws, clamps, etc.) to the bottom forming block via positioning rods 124 and 126 formed on either side of the bottom forming block as shown.

Figure 6:
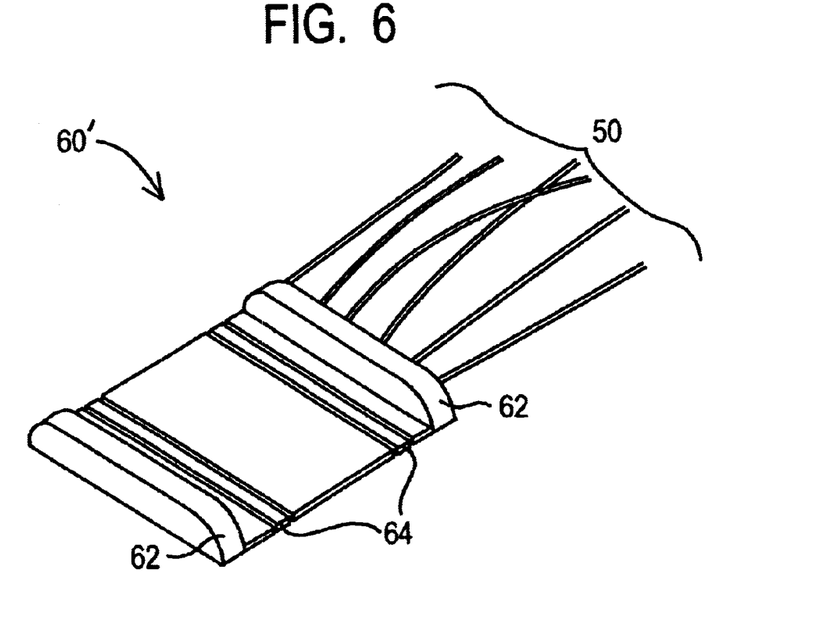
FIG. 6 depicts a fully wound and pressed coil assembly of the present invention.

By way of example, assume that wire chosen is Bondeze M manufactured by Phelps-Dodge. The coil forming process includes the steps of: placing the wound coil in the press and preheating the press unit 100 for 5 minutes to a temperature at or about the temperature required to cure the bonding agent on the magnetic wire. After the press is closed about the coils and the end forming blocks are in place, the entire unit is heated to a temperature of 390 degrees F. for 5 minutes. The entire unit is cooled to 70 degrees F. for 7 minutes, and the press is opened and the coil is removed. The formed coil 60' is depicted in FIG. 6. FIG. 6 also depicts the tape 64 described above with reference to FIG. 3 for holding the coils together that are wound on the winding fixture. The tape can be removed once the coil is fully formed as shown in FIG. 6.

The winding fixture and press fixture and processes of the present invention produce an exceptionally rigid, self-supporting, equally spaced coil assembly, as compared to the prior art. Additionally, the present invention permits highly repeatable results so that each machine-wound coil is identical and uniform. Tolerance build-up is minimized since the entire pole can be formed as a single unit. Positioning coil assemblies back-to-back and inverting the phase position of each coil thereby balances the phase resistance and averaging any disturbances along the conduction path.

Thermal conductivity is significantly improved by this method since there is intimate contact between conductors. The coil acts as one solid unit transferring heat via conduction directly through the coil to the end turns and out into the attachment bracket, housing or heat sink. This feature minimizes convection heat that reduces motor performance and can degrade magnet performance in certain applications. The coil assemblies are encapsulated and molded in the finished coil assembly to complete the motor. The present invention also provides low manufacturing costs, high copper density and component-to-component repeatability. This repeatability ensures low reject rates in the production process and consistent unit-to-unit performance.

Those skilled in the art will recognize that numerous modifications can be made to the present invention. All such modifications are deemed within the scope of the present invention, only as limited by the appended claims.

What is claimed is:

1. A coil winding fixture, comprising:
   a first interchangeable winding arm having a first set of a plurality pins extending therefrom, said first plurality pins defining a first plurality of slots between two adjacent pins;
   a second interchangeable winding arm having a second set of a plurality pins extending therefrom, said second plurality pins defining a second plurality of slots between two adjacent pins;
   said first and second winding arms held in fixed relationship to one another so that said first and second plurality of pins are held at angles to one another, and so that said first plurality of slots and said second plurality of slots are held in parallel with respect to adjacent slots, so that magnetic wire can be wound around said pins and placed in the first and second plurality of slots.

2. A coil winding fixture as claimed in claim 1, further comprising a pair of spaced boss pins mounted to a hub and extending from the hub in the same direction generally parallel to one another, wherein said first and second winding arms removeably and rotatably mounted on a respective said boss pin, said boss pins having a cross-sectional shape to permit selective rotation of said winding arms.

3. A winding fixture as claimed in claim 2, further comprising a locking plate having openings formed therein mated to the cross-sectional shape of said boss pins, said locking plate being removeably attached to said boss pins to lock said winding arms relative to each other and to prevent rotation of said winding arms.

4. A winding fixture as claimed in claim 1, wherein said winding arms each comprise a first member and a second member removeably attached to one another, each said first member having said winding pins removeably formed therein.

5. A winding fixture as claimed in claim 3, wherein said locking plate locking said winding arms relative to one another to permit wire to be placed in selected plurality of said slots to form a coil, and said boss pins permitting said winding arms to rotate so that said coil can be removed from said pins.

6. A winding fixture as claimed in claim 2, further comprising a mounting bracket to mount said winding fixture on a rotatable motor mechanism to rotate said winding fixture.

7. A winding fixture as claimed in claim 1, wherein said pins having a cross-sectional diameter selected to create a desired slot width, said slot width being sized according to the gauge of said wire.

8. A winding fixture as claimed in claim 1, wherein said slots aligned with one another so that two adjacent slots are parallel.

9. A coil winding system, comprising:
a winding machine for controlling a winding fixture in a rotational axis and a winding needle in a linear axis;
said winding fixture comprising a first interchangeable winding arm having a first plurality of in-line pins extending therefrom, said first plurality pins defining a first plurality of slots between two adjacent pins; a second interchangeable winding arm having a second plurality of in-line pins extending therefrom, said second plurality pins defining a second plurality of slots between two adjacent pins; said first and second winding arms held in fixed relationship to form a winding fixture;
said winding needle mounted on a needle arm mounted in a predetermined location with respect to said first and second in-line pins;
said winding machine controlling the linear motion of said winding needle along said linear axis and the rotational motion of said winding fixture in said rotational axis to cause said winding needle to place magnet wire in a selected one of said slots.

10. A coil winding system as claimed in claim 9, wherein said first and second plurality of in-line pins are held at angles to one another in at least one axis, and said first plurality of slots and said second plurality of slots are held in parallel with respect to adjacent slots.

11. A coil winding system as claimed in claim 10, wherein said winding needle feeding magnetic wire into a selected plurality of said slots.

12. A coil winding system as claimed in claim 9, said winding fixture further comprising a pair of spaced boss pins mounted to a hub and extending from the hub in the same direction generally parallel to one another, wherein said first and second winding arms removeably and rotatably mounted on a respective boss pin, said boss pins having a cross-sectional shape to permit selective rotation of said winding arms.

13. A coil winding system as claimed in claim 12, said winding fixture further comprising a locking plate having openings formed therein mated to the cross-sectional shape of said boss pins, said locking plate being removeably attached to said boss pins to lock said winding arms relative to each other and to prevent rotation of said winding arms.

14. A winding system as claimed in claim 12, wherein said locking plate locking said winding arms relative to one another to permit wire to be placed in selected plurality of said slots to form a coil, and said boss pins permitting said winding arms to rotate so that said coil can be removed from said pins.

15. A winding fixture as claimed in claim 9, further comprising a mounting bracket to mount said winding fixture on said rotational motor mechanism to rotate said winding fixture.

16. A winding system as claimed in claim 11, wherein said pins having a cross-sectional diameter selected to create a desired slot width, said slot width being sized according to the gauge of said wire.

17. A winding system as claimed in claim 9, wherein said slots aligned with one another so that two adjacent slots are parallel.

18. A winding system as claimed in claim 9, said needle arm further comprising a needle motor to move said needle with respect to said plurality of in-line pins.

19. A winding system as claimed in claim 9, said winding motor further comprising a position controller for controlling the linear position of said needle arm via said controllable linear motor with respect to said slots, and for controlling the rotational position of said winding fixture via said controllable rotational motor.

20. A winding system as claimed in claim 9, said winding motor further comprising a programmable interface for sending commands and data to said controllable rotational motor and said controllable linear motor to control the linear and rotational positions thereof, respectively.

21. A winding system as claimed in claim 9, wherein said winding machine controlling said winding fixture and said winding needle to wind wire into said slots to form at least one motor coil having a predetermined half pole width defined by the number of slots wound per half pole, a depth defined by the number of times wire is wound into a slot, and a coil height defined by the space between said first and second in-line pins.

22. A coil forming fixture, comprising:
a bottom forming block having a slot dimensioned to receive a coil winding structure having end turns; and
a removable saddle having a face and a lip adapted to receive said coil winding structure wherein said end turns placed over said lip, said saddle placed in said slot for holding the coil winding structure on the face of the saddle;
a top forming block placed over said coil winding structure, said saddle and said bottom forming block; and
a press placed over said top forming block and removably attached to said bottom forming block.

23. A coil forming fixture as claimed in claim 22, wherein pressure and heat being applied to said fixture so that said coil winding structure is formed into a position defined by the space between said a top forming block and said saddle.

24. A coil forming fixture as claimed in claim 22, further comprising end forming blocks having tongue members to contact said coil winding structure on either said thereof.

* * * * *